United States Patent [19]

Idel

[11] Patent Number: 4,585,095
[45] Date of Patent: Apr. 29, 1986

[54] ACTUATING DEVICE FOR A DISC BRAKE

[75] Inventor: Gerd Idel, Stockheim, Fed. Rep. of Germany

[73] Assignee: Bergische Achsenfabrik, Fr. Kotz & Sohne, Wiehl, Fed. Rep. of Germany

[21] Appl. No.: 629,674

[22] Filed: Jul. 11, 1984

[30] Foreign Application Priority Data

Jul. 12, 1983 [DE] Fed. Rep. of Germany ....... 3325085

[51] Int. Cl.$^4$ ............................................. F16D 51/00
[52] U.S. Cl. .................................... 188/71.9; 74/110; 188/79.5 GE; 192/93 C; 192/111 A
[58] Field of Search .................. 188/71.1, 71.9, 72.7, 188/79.5 GE, 79.5 GC, 79.5 K, 196 R, 196 V, 196 BA, 196 D, 343, 196 B; 192/111 A, 93 C; 74/110

[56] References Cited

U.S. PATENT DOCUMENTS 3,194,349 7/1965 Kershner et al. ................... 188/71.8
3,986,584 10/1976 Wright et al. ...................... 188/71.8
4,194,596 3/1980 Garrett et al. ..................... 188/72.7

FOREIGN PATENT DOCUMENTS 2400247 7/1974 Fed. Rep. of Germany.
2332394 1/1975 Fed. Rep. of Germany.
1250141 10/1971 United Kingdom.

Primary Examiner—Bruce H. Stoner, Jr.
Assistant Examiner—Robert J. Oberleitner
Attorney, Agent, or Firm—Yount & Tarolli

[57] ABSTRACT

The subject of the invention is an actuating device for a disc brake for motor vehicles or trailers having opposed brake jaws 5, 8 on both sides of a brake disc, which cooperates with a traction and a pressure rod, while between the traction rod 6 and the pressure rod 7 are arranged pairs of wedges consisting of outer wedges 10 and inner wedges 11. To provide this actuating device with a simply constructed and automatically acting resetting device for compensating for wear of the brake linings, there is provided an automatic resetting device between the inner wedges 11, consisting of a threaded bolt 17 with wedge pieces 18 lying between the inner wedges 11 and a reset lever, which is arranged with a movable collar 20 on the threaded bolt 17, cooperating with a stationary slide 21.

2 Claims, 6 Drawing Figures

ACTUATING DEVICE FOR A DISC BRAKE

BRIEF SUMMARY OF THE INVENTION

The subject of the invention is an actuating device for a disc brake for motor vehicles or trailers, the brake jaws of which are arranged on both sides of a brake disc and cooperate with a traction and a pressure rod, while between the traction rod and the pressure rod are arranged pairs of wedges consisting of outer wedges and inner wedges.

From German Disclosure No. 2,400,247 there is known a vehicle brake, of which the actuating device has a one-part double wedge as a spreading body. An automatic resetting device is also provided, which has a catch borne by an operation wedge, which cooperates with a stopping wheel placed on a spindle, and with an over-stroke is designed to effect an automatic resetting. This known resetting device has a construction susceptible to From U.S. Pat. No. 4,194,596 there is known an operation device for a disc brake, of which the brake jaws are arranged on both sides of a brake disc and cooperate with a traction and a pressure rod, while between the traction rod and the pressure rod, pairs of wedges, consisting of outer and inner wedges are arranged. Between the two inner wedges, supported by rollers, no resetting device for the equalization of brake lining wear is provided.

Starting from this, the invention attacks the problem of providing a simply constructed and directly acting actuating device for disc brakes, with an automatic resetting device, also simply constructed, for the equalization of brake lining wear.

As a technical solution of this problem there is proposed an actuating device in which, between the inner wedges, separated from each other, an automatic resetting device is arranged, which consists of a threaded bolt with wedge pieces lying between the inner wedges, and a reset lever, which is arranged with a movable collar on the threaded bolt and cooperates with a stationary slide.

An actuating device, designed according to this technical specification, has the advantage of a very simply constructed automatic resetting device, reliable in operation and requiring little maintenance, for the equalization of brake lining wear. With this the invention makes an important contribution to safety in road traffic.

BRIEF DESCRIPTION OF THE DRAWINGS

Other details and advantages of the subject of the invention are given from the description which follows, of the respective drawings, in which an actuating device designed according to the invention is represented in the example of a floating caliper disc brake. In the drawings.

DETAILED DESCRIPTION

Figure 1:
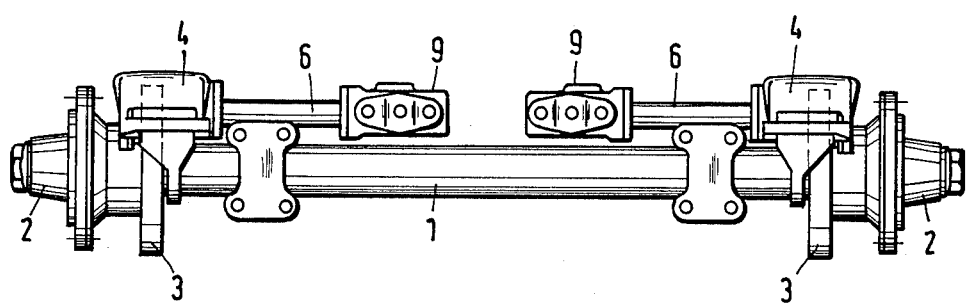
FIG. 1 shows an axle with floating caliper disc brakes, in top view.
Figure 2:
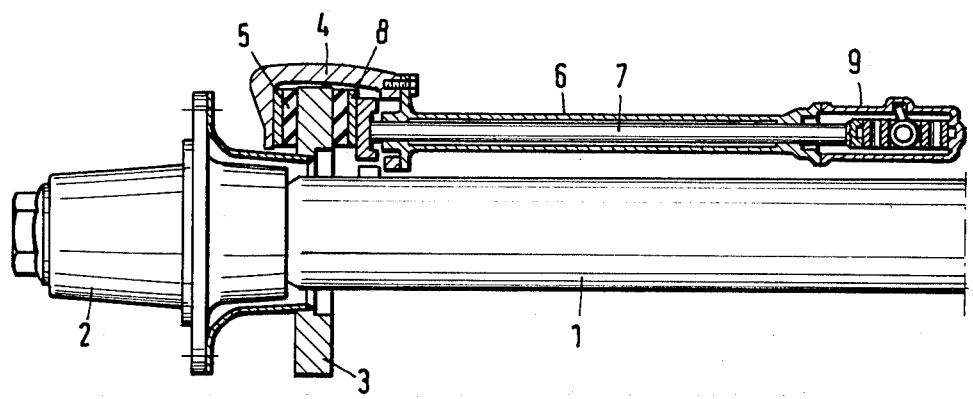
FIG. 2 shows an enlarged section from FIG. 1 with a floating caliper disc brake, represented in section.

On an axle body 1 there are supported rotatable wheel hubs 2 with brake discs 3. Each brake disc 3 is straddled by a floating caliper 4, to the outside of which is fastened a brake jaw 5 and against the inside of which engages a tubular traction rod 6. Inside the traction rod there is supported a pressure rod 7, to which is fastened a brake jaw 8, inside the floating caliper 4.

To the inner end of each traction rod 6 there is flanged a housing 9 in which there is disposed an actuating device, supported floating, for each disc brake.

The actuating device consists of two pairs of wedges, each with an outer wedge 10 and an inner wedge 11, as well as a membrane cylinder 12, having a piston rod 13 connected with the two inner wedges 11 through a spring clamp 14. Between the pairs of wedges are arranged flat-cage roller bearings 15. One of the outer wedges 10 bears against a flange on a pressure rod 7, and the other of the outer wedges 10 bears against a wall of the housing 9.

Between the two inner wedges 11, the upper ends of which are guided on a spring 16 connected with the piston rod 13, there is arranged an automatic resetting device, for equalizing wear on the brake linings, which consists of a threaded bolt 17 with wedge pieces 18 (FIG. 4), lying between the inner wedges 11, and a resetting lever 19, which is supported with a one-way clutch collar 20 on the threaded bolt 17 and which engages in a slide 21 fastened to the housing 9. The two wedge pieces 18 are disposed with right and left threading on the threaded bolt 17. The contact surfaces between the inner wedges 11 and the wedge pieces 18 are conical.

The actuating device and the resetting device operate as follows:

The membrane cylinder 12 transmits a braking pressure by means of its piston rod 13 to the inner wedges 11, which press apart, through the flat cage roller bearings 15, the outer wedges 10 which move the housing 9, and thereby the traction rod 6 and the pressure rod 7 are moved oppositely in relation to each other; that is, the two brake jaws 5, 8 are clamped against the brake disc 3. When the membrane cylinder 12 is relieved of pressure, a plate spring 22, which is arranged between the traction rod 6 and a bushing 23 on the pressure rod 7, restores the normal free play between the brake jaws 5, 8 and the brake disc 3.

Figures 3, 4, 5, 6:
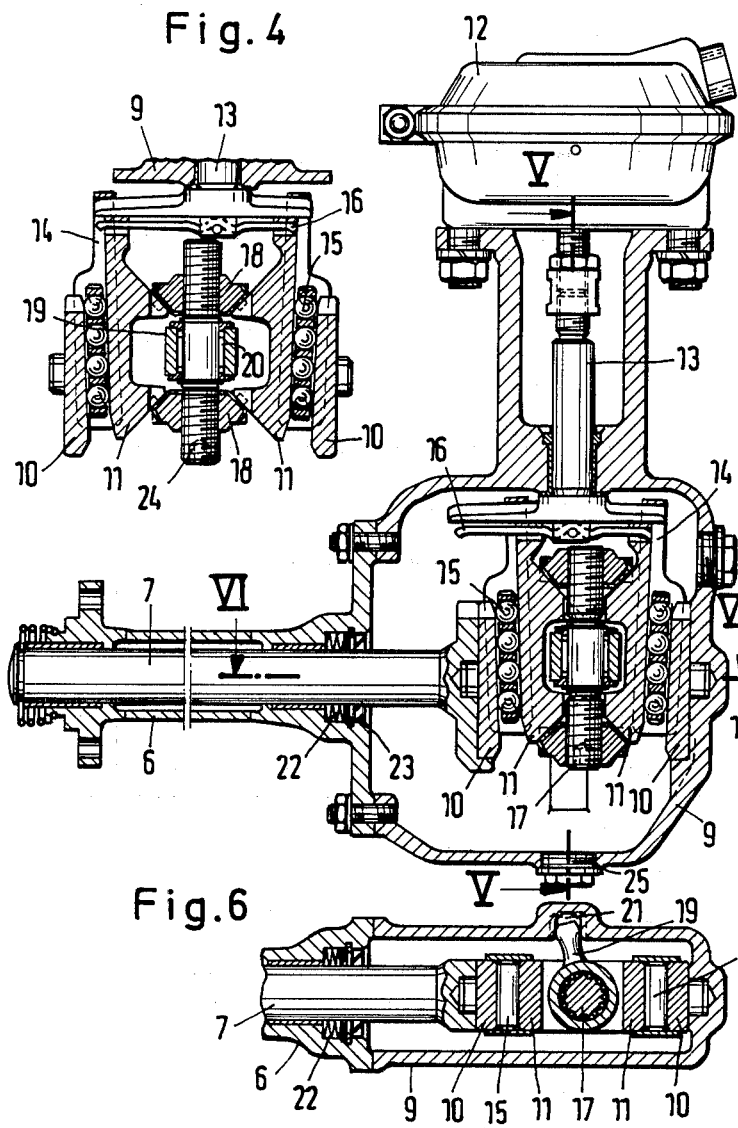
FIG. 3 shows an actuating device for the floating caliper disc brake, in starting position and in longitudinal section.
FIG. 4 shows a section from FIG. 3 with a resetting device coming into end position, in longitudinal section.
FIG. 5 shows the actuating device taken along the line V—V in FIG. 3, in side view.
FIG. 6 shows the same actuating device, taken along the line VI—VI in FIG. 3, in top view.

When the inner wedges 11, upon increasing wear of the brake linings, make too great a movement, the one-way clutch collar 20 engages the threaded bolt 17 and the threaded bolt 17 is rotated by the resetting lever 19, on the return stroke, so that the two wedge pieces 18 slide gradually inward and eventually taken the position shown in FIG. 4. In this way, the two inner wedges 11 are gradually moved apart, from the starting position shown in FIG. 3, into the end position shown in FIG. 4, and with this, the wear on the brake linings is compensated for by an increase of the distance between the two inner wedges 11.

For setting the actuating device and the resetting device to the prescribed free play, especially after changing brake linings, there is provided in one end of the threaded bolt 17 a hex socket 24, which is accessible from outside through a closing screw 25.

All the new features mentioned in the description and represented in the drawings are important to the invention, even if they have not been expressly distinguished in the claim.

I claim:

1. An actuating device for a disc brake for a vehicle which disc brake has a first and a second brake jaw located on opposite sides of a brake disc which brake jaws have brake linings theron, the brake jaws having a retracted position in which the linings thereon are spaced from respective sides of the brake disc a predetermined distance and a braking position, in which the linings engage the brake disc, said actuating device comprising:

traction and pressure rods cooperating with said brake jaws, respectively, and movable in opposite directions for moving the brake jaws from their retracted positions into their braking position, wedge actuation means for moving said traction and pressure rods to effect movement of the brake jaws to their braking position, said wedge actuation means comprising two outer wedges connected with said traction and pressure rods, respectively, for joint movement therewith and two inner wedges engaging said two outer wedges and movable relative thereto in a direction transverse to the direction of movement of said traction and pressure rods to apply a force to said two outer wedges to effect movement of said traction and pressure rods, and an automatic resetting device for resetting the retracted position of the brake jaws to compensate for wear of the brake linings and to maintain said predetermined distance, said automatic resetting device comprising wedge pieces disposed between said two inner wedges and defining a nonactuating position thereof which in turn defines the retracted position of the brake jaws, said wedge pieces being joined together by a threaded bolt rotatable to move said wedge pieces between said two inner wedges to change said nonactuating position thereof to thereby effect resetting of the retracted position of the brake jaws, said threaded bolt having a one-way clutch collar thereon, and a resetting lever attached to said one-way clutch collar for rotating said threaded bolt, means associated with one of said pressure and traction rods and cooperating with said resetting lever to effect rotation of said threaded bolt upon movement of said one of said pressure and traction rods in excess of a predetermined amount.

2. An actuating device as set forth in claim 1 wherein said means associated with one of said pressure and traction rods comprises a slide movable with said traction rod.

* * * * *